United States Patent
Liu

(10) Patent No.: US 9,330,265 B2
(45) Date of Patent: May 3, 2016

(54) METHOD FOR COMPONENT ACCESS CONTROL AND ELECTRONIC DEVICE

(75) Inventor: Yongfeng Liu, Beijing (CN)

(73) Assignees: BEIJING LENOVO SOFTWARE LTD., Beijing (CN); LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 13/824,953

(22) PCT Filed: Sep. 28, 2011

(86) PCT No.: PCT/CN2011/080276
§ 371 (c)(1),
(2), (4) Date: Mar. 18, 2013

(87) PCT Pub. No.: WO2012/041228
PCT Pub. Date: Apr. 5, 2012

(65) Prior Publication Data
US 2013/0198872 A1    Aug. 1, 2013

(30) Foreign Application Priority Data
Sep. 30, 2010   (CN) .......................... 2010 1 0502091

(51) Int. Cl.
G06F 21/60        (2013.01)
G06F 21/62        (2013.01)

(52) U.S. Cl.
CPC ............ G06F 21/60 (2013.01); G06F 21/6218 (2013.01)

(58) Field of Classification Search
USPC ............ 726/30, 2, 21, 36; 713/150, 163, 181; 380/255, 264, 276
See application file for complete search history.

(56) References Cited

U.S. PATENT DOCUMENTS

| | | |
|---|---|---|
| 6,279,154 B1 | 8/2001 | Davis |
| 2004/0024856 A1 | 2/2004 | Gere |

(Continued)

FOREIGN PATENT DOCUMENTS

| | | |
|---|---|---|
| CN | 101201884 | 6/2008 |
| EP | 0994415 | 4/2000 |
| EP | 994415 A2 * | 4/2000 |

OTHER PUBLICATIONS

English Abstract of Chinese Application No. 101201884 A, 1 page.

(Continued)

Primary Examiner — Jason K. Gee
Assistant Examiner — Sharif E Ullah
(74) Attorney, Agent, or Firm — Dentons US LLP

(57) ABSTRACT

Disclosed are a method for component access control and electronic device. The method comprises: acquiring a target component list corresponding to the first application, which list includes at least one target component required by the first application, with the at least one target component belonging to at least one basic component; after a component selection command is received, generating information about those basic components accessible by the first application from the target component list according to the component selection command; and storing the information about those basic components accessible by the first application. In the present solution, it is unnecessary to set access to all the component when applying for an application; rather, those component accessible by the application can be controlled during the installation or use of the application according to system or user requirements, thereby increasing the flexibility of the application in accessing components and reducing the probability of the user privacy being stolen.

17 Claims, 8 Drawing Sheets

(56) References Cited

U.S. PATENT DOCUMENTS

2006/0059335 A1 3/2006 Bernardi et al.
2008/0141380 A1 6/2008 Ikeda et al.
2010/0048170 A1 2/2010 Jewsbury et al.

OTHER PUBLICATIONS

Beijing Lenovo Software Ltd; PCT/CN2011/080276 filed Sep. 28, 2011; Chinese International Preliminary Report on Patentability; mailed Dec. 15, 2011; International Bureau of WIPO; 12 pages.
Beijing Lenovo Software Ltd. et al.; PCT/CN2011/080276 filed Sep. 28, 2011; Notification of Transmittal of Translation of the International Preliminary Report on Patentability; mailed Apr. 11, 2013; International Bureau of WIPO; 1 page.
Beijing Lenovo Software Ltd; PCT/CN2011/080276 filed Sep. 28, 2011; International Preliminary Report on Patentability English Translation; mailed Dec. 15, 2011; International Bureau of WIPO; 11 pages.
Chinese Patent Application No. 201010502091.0, Chinese Patent Office, First Office Action mailed on Oct. 18, 2013; 14 pages.
English Text of Chinese Patent Application No. 201010502091.0, Chinese Patent Office, First Office Action mailed on Oct. 18, 2013; 17 pages.
Chinese Patent Application No. 201010502091.0, Chinese Patent Office, Second Office Action mailed on Apr. 1, 2014; 14 pages.
English Text of Chinese Patent Application No. 201010502091.0, Chinese Patent Office, Second Office Action mailed on Apr. 1, 2014; 19 pages.

* cited by examiner

METHOD FOR COMPONENT ACCESS CONTROL AND ELECTRONIC DEVICE

CROSS REFERENCE TO RELATED APPLICATIONS

This application is a national phase application based on international application number PCT/CN2011/080276, filed Sep. 28, 2011, and claims priority of Chinese Patent Application No. CN 201010502091.0, filed Sep. 30, 2010, the contents of both of which are incorporated by reference herein in their entireties.

BACKGROUND

The present application relates to the field of communication technology and in particular, to a component of access control method and an electronic apparatus.

The Android operating system is an operating system of smart terminal based on Linux kernel. Each application of the Android operating system runs in java virtual machines separated from each other, each Android application corresponds to a plurality of components, and each component corresponds to one basic function in the operating system, such as messaging, network access, and so on. The Android application implements the access to the basic function in the operating system through the access of the component. Each Android application explicitly declares the component needed to be accessed by a file of AndroidManifest.xml. In the prior art, any Android application needs to apply for an access authority of the associated component as installing. Taking the Android applications installed in the mobile phone as example, the function of the component needed to be accessed includes sending and receiving messages, making phone calls, acquiring location services, and so on. The function corresponding to these components can be only used while the mobile phone operates after these components are applied for.

In prior art research, once the associated component of the Android application is applied for, it cannot be modified. Thus, some malicious applications can utilize the component communication mechanism to use various kinds of system component functions continuously (such as sending messages, making phone calls, acquiring location services, and so on), to cause the user privacy to be stolen and to cause an unstable running of the operating system. For example, a hacker may exploit a music player, and may apply for a component function of reading the message of the user. Once the user installs the application of the music player, the application can read all of the messages of the user and send them to a specified mailbox. The user cannot know that the privacy data has been illegally acquired, and the maliciously reading message would consume the system resources in the terminal, resulting in instability of the system running.

SUMMARY

The embodiments of the present application provide a component access control method and an electronic apparatus to solve the problem that the access setting of the applications to the component is difficult to be modified, which results in the privacy data of the user being stolen, and the system running being unstable in the prior art.

In order to solve the above technical problem, the embodiments of the present application provide the following technical solutions:

A component access control method applied to an electronic apparatus, the electronic apparatus comprises an operating system, at least one basic component is included in the operating system, and each basic component corresponds to one function of the operating system. The method comprises acquiring a target component list corresponding to the first application as installing the first application to the operating system, at least one target component needed to be used by the first application is included in the target component list, at least one target component belongs to the at least one basic component; generating information of the basic components that the first application is allowed to access from the target component list, according to a component selection command after receiving the component selection command; and saving the information of the basic components that the first application is allowed to access.

Receiving the component selection command comprises receiving the component selection command input manually by the user; or receiving the component selection command generated, according to a preset component access strategy.

Generating the information of the basic components that the first application is allowed to access from the target component list, according to the component selection command comprises acquiring access selection result of each target component in the target component list, according to the component selection command; generating a prevention access component list according to the access selection result, the prevention access component list includes the basic component that the first application is prohibited from accessing; and saving the information of the basic components that the first application is allowed to access, specifically: saving the prevention access component list and the target component list.

It further comprises intercepting the access of the first application to the target component list when the first application accesses a first target component; retrieving the prevention access component list, preventing the first application from accessing the first target component, when the first target component is included in the prevention access component list; retrieving the target component list, when the first target component is not in the prevention access component list, allowing the first application to access the first target component when the first target component is included in the target component list, which prevents the first application from accessing the first target component when the first target component is not included in the target component list.

Generating the information of the basic components that the first application is allowed to access from the target component list, according to the component selection command comprises acquiring access selection result of each target component in the target component list according to the component selection command; generating a mix access component list, according to the access selection result, each target component and the information on whether it is allowed to be accessed are included in the mix access component list; and saving the information of the basic components that the first application is allowed to access is specifically: saving the mix access component list.

It further comprises retrieving the mix access component list when the first application accesses the first target component, acquiring the information on whether the first target component is allowed to be accessed; when the information indicates allowance, the first application is allowed to access the first target component, when the information indicates prevention, the first application is prevented from accessing the first target component.

Generating the information of the basic components that the first application is allowed to access from the target component list according to the component selection command comprises acquiring access selection result of each target component in the target component list, according to the component selection command; generating an allowance access component list, according to the access selection result, the basic components that the first application is allowed to access is included in the allowance access component list; and saving the information of the basic components that the first application is allowed to access, specifically: saving the allowance access component list.

It further comprises retrieving the allowance access component list when the first application accesses the first target component; allowing the first application to access the first target component when the first target component is retrieved in the allowance access component list, and preventing the first application from accessing the first target component when the first target component is not retrieved in the allowance access component list.

The preset component access strategy comprises setting the first basic component as the basic component that all of the applications installed in the operating system are prevented from accessing when the function corresponding to the first basic component.

A component access control method applied to an electronic apparatus, the electronic apparatus comprises an operating system, at least one basic component is included in the operating system, and each basic component corresponds to one function of the operating system, the method comprises triggering the first application to access the first target component when the first application is operated, at least one target component needed to be used by the first application is included in the target list corresponding to the first application, the first target component is included in the at least one target component that belongs to at least one basic component; receiving a component control command controlling the access of the first application to the first target component, according to the component control command.

Receiving the component control command comprises receiving the component control command that the first target component is allowed to be accessed input manually by the user; or receiving the component control command that the first target component is allowed to be accessed generated, according to the preset component access strategy.

It further comprises dividing the target components that the first application is allowed to access in safety class, and making statistic of access information of each target component the first application is made a risk assessment, according to the safety class and the access information to obtain a risk assessment value; and preventing the first application from accessing any of the target components when the risk assessment value of the first application exceeds a preset threshold.

It further comprises switching the entry identification of the first application from a first display effect to a second display effect.

An electronic apparatus, the electronic apparatus comprises an operating system, at least one basic component is included in the operating system, each basic component corresponds to one function in the operating system, and the electronic apparatus comprises an acquiring unit for acquiring a target component list corresponding to the first application as installing the first application to the operating system, at least one target component needed to be used by the first application is included in the target component list, and at least one target component belongs to one basic component; a receiving unit for receiving a component selection command; a generating unit for generating information of the basic components that the first application is allowed to access from the target component list, according to the component selection command; and a saving unit for saving the information of the basic components that the first application is allowed to access.

The receiving unit comprises at least one of the following units: a first receiving unit for receiving the component selection command input manually by the user; and a second receiving unit for receiving the component selection command generated, according to a preset component access strategy.

The generating unit comprises a first selection result acquiring unit for acquiring an access selection result of each target component in the target component list, according to the component selection command; a first component list generating unit for generating a prevention access component list according to the access selection result, the basic components that the first application is prohibited from accessing are included in the prevention access component list; and the saving unit is specifically for saving the prevention access component list and the target component list.

It further comprises an intercepting unit for intercepting the access of the first application to the target component list when the first application accesses the first target component; a first retrieving unit for retrieving the prevention access component list; and a first control unit for preventing the first application from accessing the first target component, when the first target component is included in the prevention access component list, that results in retrieving the target component list when the first target component is not in the prevention access component list. This in turn, allows the first application to access the first target component, when the first target component is included in the target component list, preventing the first application from accessing the first target component when the first target component is not included in the target component list.

The generating unit comprises a second selection result acquiring unit for acquiring an access selection result of each target component in the target component list according to the component selection command; a second component list generating unit for generating a mix access component list, according to the access selection result, each target component and information on whether it is allowed to be accessed are included in the mix access component list; and the saving unit is specifically for saving the mix access component list.

It further comprises a second retrieving unit for retrieving the mix access component list when the first application accesses the first target component, acquiring the information on whether the first target component is allowed to be accessed; and a second control unit for allowing the first application to access the first target component when the information indicates allowance and preventing the first application from accessing the first target component when the information indicates prevention.

The generating unit comprises a third selection result acquiring unit for acquiring an access selection result of each target component in the target component list according to the component selection command; a third component list generating unit for generating an allowance access component list according to the access selection result, the basic components that the first application is allowed to access are included in the allowance access component list; and the saving unit is specifically for saving the allowance access component list.

It further comprises a third retrieving unit for retrieving the allowance access component list when the first application accesses the first target component; a third control unit for allowing the first application to access the first target component when the first target component is retrieved in the allowance access component list, preventing the first application from accessing the first target component when the first target component is not retrieved in the allowance access component list.

An electronic apparatus, the electronic apparatus comprises an operating system, at least one basic component is included in the operating system, each basic component corresponds to one function in the operating system, and the electronic apparatus comprises a triggering unit for triggering the first application to access the first target component when the first application is operated, at least one target component needed to be used by the first application is included in the target list corresponding to the first application, the first target component is included in the at least one target component, and at least one target component belongs to the at least one basic component; a receiving unit for receiving a component control command; and a control unit for controlling whether the first application accesses the first target component, according to the component control command.

The receiving unit comprises at least one of the following units a first receiving unit for receiving the component control command that whether the first target component is allowed to be accessed input manually by the user; a second receiving unit for receiving the component control command that whether the first target component is allowed to be accessed generated according to a preset component access strategy.

It further comprises a statistical unit for dividing the target components that the first application is allowed to access in safety class and making statistic of access information of each target component; an assessing unit for making a risk assessment to the first application according to the safety class and the access information to obtain a risk assessment value; a preventing unit for preventing the first application from accessing any of the target components when the risk assessment value of the first application exceeds a preset threshold.

It further comprises a switching unit for switching the entry identification of the first application from a first display effect to a second display effect.

It can be seen from the technical solutions provided by the embodiments of the present application that, the electronic apparatus in the embodiments of the present application comprises an operating system, at least one basic component is included in the operating system, and each basic component corresponds to one function in the operating system. A target component list corresponding to the first application is acquired as installing the first application to the operating system. Information of the basic components that the first application is allowed to access is generated from the target component list, according to the component selection command, and the information of the basic components that the first application is allowed to access is saved. Compared to prior art, the present application does not need to set the access all of the components for the applications. However, it can control the components that the applications are allowed to access as installing the application or using the application, according to the requirement of the system or the user, to increase the flexibility of the application, accessing the component, and reducing the probability of the user's privacy being stolen. Since the access of the application to the component can be controlled and selected, the access resource of the system can be saved efficiently, and the stability of the system is increased.

DETAILED DESCRIPTION

In the following plurality of embodiments of the present application, some provide the component access control method, and some provide the electronic apparatus. The embodiments of the component access control method of the present application are applied to the electronic apparatus. The electronic apparatus comprises an operating system, which includes at least one basic component; each basic component corresponds to one function of the operating system. The operating system may comprise Symbian, Android, iOS, WinCE, and so on. In the following embodiments of the present application, description will be made by taking the Android application as example.

In order for those skilled in the art to understand the technical solutions of the embodiments of the present application better, and for the above object, characteristics and advantages of the embodiments of the present application are explained. In addition, the technical solutions of the embodiments of the present application are further explained in detail in combination with the accompanying drawings as follows.

Figure 1:
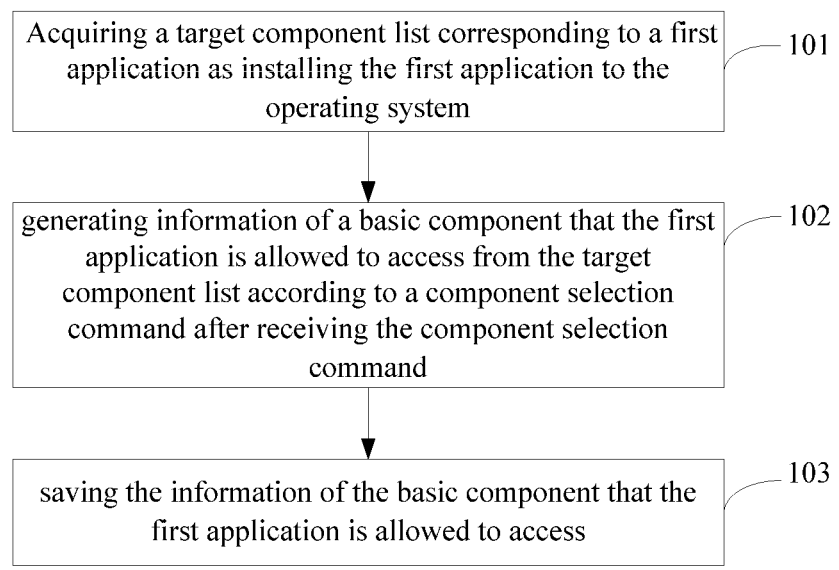
FIG. 1 is a flow chart of the first embodiment of the component access control method of the present application.

FIG. 1 is a flow chart of the first embodiment of the component access control method of the present application:

At step 101, a target component list corresponding to a first application as installing the first application to the operating system is acquired.

Wherein, at least one target component needed to be used by the first application is included in the target component list, the at least one target component belongs to the at least one basic component.

The applications in the embodiment of the present application may specifically be Android applications. The operating system corresponding to the applications is the operating system based on Linux kernel. For example, the player software installed in the smart terminal belongs to one Android application, and the function corresponding to the basic component in the operating system may comprise privacy access type function (including reading messages, reading position information, reading schedules, reading address books, access of the camera apparatus, and so on), paid service type function (including sending messages, making phone calls, accessing network, and so on), data modification type applications (including deleting applications package, formatting file systems, writing schedules, writing address books, and so on), malicious threat type function (including installing packages, modifying system configurations, reading log files, and so on), and other risk type applications (including battery consumption, hardware breakage, user customized high risk authority, and so on). The Android applications implement each specific function and access the components corresponding to the specific function correspondingly.

In the embodiment of the present application, each basic component may only correspond to one specific function, for example, component one only corresponds to the function of sending messages, and component two only corresponds to the function of accessing networks.

At step 102, generating information of the basic components that the first application is allowed to access from the target component list, according to a component selection command after receiving the component selection command.

Specifically, the received component selection command may be the component selection command input manually by the user, or the component selection command generated according to the preset component access strategy.

Wherein, the preset component access strategy may specifically be when the function corresponding to the first basic component is abnormal, and when setting the first basic component as the basic component that all of the applications installed in the operating system are prevented from accessing.

At step 103, the information of the basic components that the first application is allowed to access.

Figure 2:
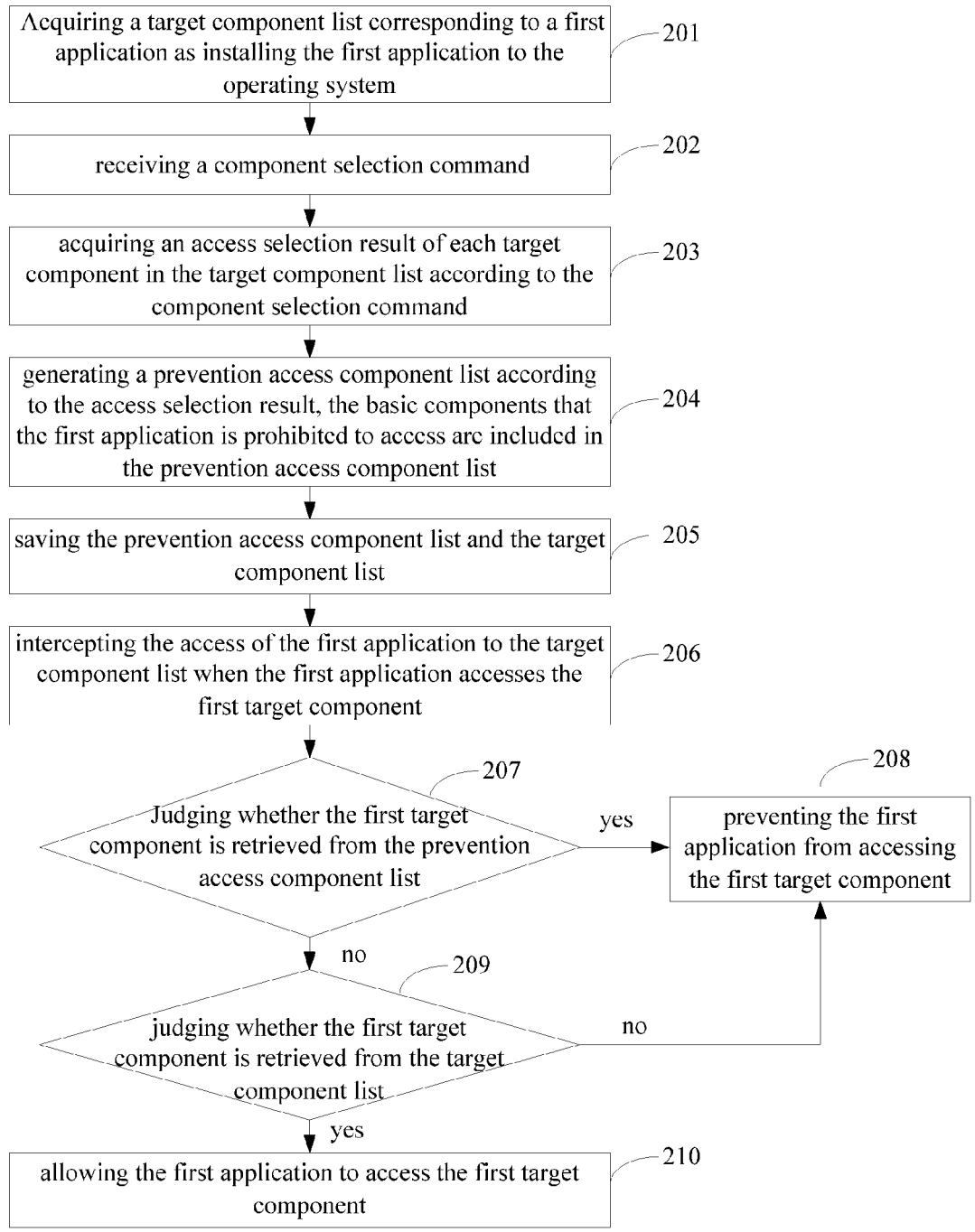
FIG. 2 is a flow chart of the second embodiment of the component access control method of the present application.

FIG. 2 is a flow chart of the second embodiment of the component access control method of the present application; the embodiment illustrates the procedure of implementing component access control through a prevention access component list and the target component list.

At step 201, the target component list corresponding to the first application as installing the first application to the operating system is acquired.

At least one target component needed to be used by the first application is included in the target component list, and at least one target component belongs to a part of the several basic components in the operating system. In the embodiment of the present application, when the first application is the Android applications, the target component list is generally a file of format of AndroidManifest.xml. This file records all of the target components corresponding to the first application. This embodiment describes the application one corresponding to the target component A, the target component B, and the target component C as example.

Step 202 illustrates receiving the component selection command.

In this embodiment, the received component selection command may be the component selection command input manually by the user, or the component selection command generated according to the preset component access strategy.

Wherein, the user inputs the component selection command manually, the target component list corresponding to the application one is called out firstly. Then the user selects manually the target component A, the target component B, or the target component C, which are allowed to be accessed by the selection result of Yes/No. When the component selection command is generated, according to the preset component access strategy, it is assumed that the component access strategy is prohibiting the application from accessing the target component B. Whether the target component B is included in the target component list after the target component list corresponding to the application one is called out, and if the target component B is included therein, it is automatically set as prohibiting the application one from accessing the target component B.

Step 203: acquiring the access selection result of each target component in the target component list according to the component selection command.

In the step 202, no matter the component selection command is input manually by the user, or the component selection command is generated according to a preset component access strategy, the access selection result of the application 1 to the target component is generated, it is assumed that the selection result is prohibiting the application 1 from accessing the target component B.

Step 204: generating a prevention access component list according to the access selection result, the basic component that the first application is prohibited from accessing is included in the prevention access component list.

The prevention access component list of the application one generated according to the aforementioned selection result includes the target component B.

Step 205: saving the prevention access component list and the target component list.

After saving the prevention access component list and the target component list, the installation of the application 1 in the system is completed, and in a subsequent usage procedure, allowing to access or preventing from accessing the basic component can be implemented according to the installation result of the application 1, the following steps 206 to 210 show this procedure.

Step 206: intercepting the first application to access the target component list when the first application accesses the first target component.

In this embodiment, it is assumed that the first application accessing the first target component is specifically the application 1 accessing the target component B, according to the implementation mode of the prior art, the system needs to retrieve the target component list according to the identification of the application 1, if the target component B is retrieved, it is allowed to be accessed, otherwise, it is prohibited from being accessed; and in the embodiment of the present application, firstly, the access of the application 1 to the target component list needs to be intercepted, since all of the target components that the application 1 can access originally are held in the target component list.

When the access of the first application to the target component list is intercepted in this embodiment, it can be implemented by employing the hook (function), specifically, one hook function checkDynPermission( ) for examining the authority is added in PackageManageService type under the operating system architecture, the access of the application to the target component list is examined through the hook function, the target component list is prohibited from being accessed before the prevention access component list is not accessed. Of course, the above-described function can also be implemented by other manners, especially in different operating systems, the name of the function of the same manner may be different, and no definition is made herein.

Step 207: judging whether a first target component is retrieved from the prevention access component list, if so, step 208 is executed; otherwise, step 209 is executed.

After the access of the application 1 to the target component list is intercepted, the prevention access component list is retrieved, that is, whether the target component B is saved in the prevention access component list is retrieved.

Step 208: preventing the first application from accessing the first target component, finishing the current flow.

When the target component B is retrieved in the prevention access component list, the first application is prevented from accessing the target component B.

Step 209: judging whether a first target component is retrieved from the target component list, if so, step 210 is executed; otherwise, step 208 is executed.

When the target component B is not retrieved in the prevention access component list, the target component list is further retrieved, if the target component B is retrieved in the target component list, the application 1 is allowed to access it, otherwise it is prohibited.

Step 210: allowing the first application to access the first target component, finishing the current flow.

In the above-described embodiment, it is assumed that the first application accessing the first target component is specifically the application 1 accessing the target component D, firstly, the access of the application 1 to the target component list is intercepted through the hook function, and then the prevention access component list is retrieved, the target component D can't be retrieved in the list, thus it continues to retrieve the target component list, the target component D still can't be retrieved in the list, thus the application 1 is prevented from accessing the target component D; it is assumed that the first application accessing the first target component is specifically the application 1 accessing the target component A, firstly, the access of the application 1 to the target component list is intercepted through the hook function, and then the prevention access component list is retrieved, the target component A can't be retrieved in the list, thus it continues to retrieve the target component list, the target component A is retrieved in the list, thus the application 1 is allowed to access the target component A.

Figure 3:
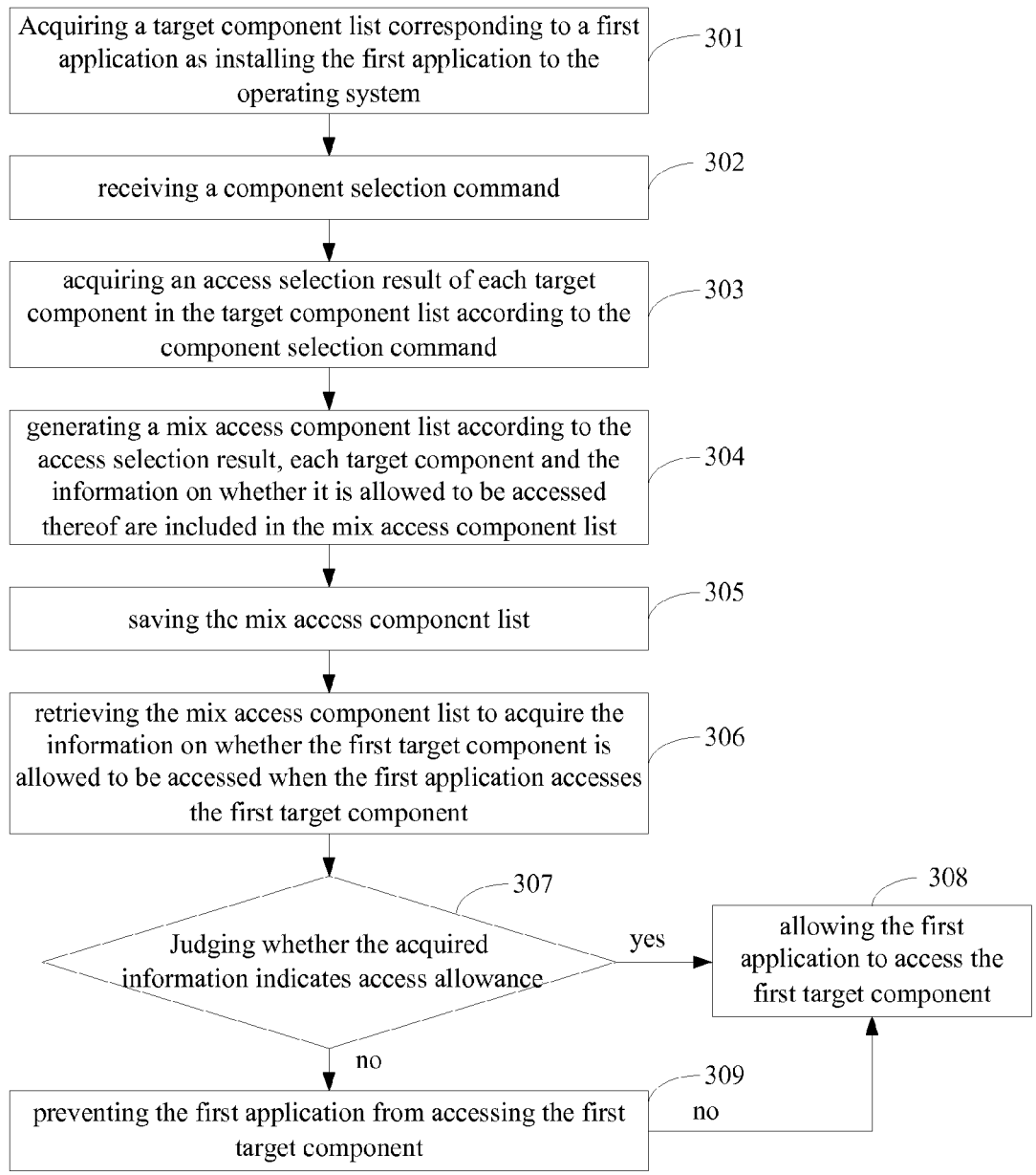
FIG. 3 is a flow chart of the third embodiment of the component access control method of the present application.

Referring to FIG. 3, it is a flow chart of the third embodiment of the component access control method of the present application, this embodiment shows the procedure of implementing the component access control through a mix access component list:

Step 301: acquiring the target component list corresponding to the first application as installing the first application to the operating system.

At least one target component needed to be used by the first application is included in the target component list, the at least one target component belongs to a part of the several basic components in the operating system. In the embodiment of the present application, when the first application is the Android applications, the target component list is generally a file of format of AndroidManifest.xml, this file records all of the target components corresponding to the first application, this embodiment describes by taking the application 1 corresponding to the target component A, the target component B and the target component C as example.

Step 302: receiving a component selection command.

In this embodiment, the received component selection command may be the component selection command input manually by the user, or the component selection command generated according to the preset component access strategy.

Wherein, when the component selection command is input manually by the user, the target component list corresponding to the application 1 is called out firstly, then the user selects manually that whether the target component A, the target component B, the target component C are allowed to be accessed, the selection result is represented by Yes/No; when the component selection command is generated according to the preset component access strategy, it is assumed that the component access strategy is prohibiting the applications from accessing the target component B, whether the target component B is included in the target component list is retrieved after the target component list corresponding to the application 1 is called out, and if the target component B is included, it is automatically set as prohibiting the application 1 from accessing the target component B.

Step 303: acquiring the access selection result of each target component in the target component list according to the component selection command.

In the step 302, no matter the component selection command is input manually by the user, or the component selection command is generated according to a preset component access strategy, the access selection result of the application 1 to the target component is generated, it is assumed that the selection result is prohibiting the application 1 from accessing the target component B.

Step 304: generating the mix access component list according to the access selection result, each target component and information on whether it is allowed to be accessed are included in the mix access component list.

A target component identification field and whether the field is allowed to be accessed can be set in the mix access component list, according to the aforementioned selection result, it can know that the mix access component list of the application 1 generated can be shown as in the following table 1:

Table 1
Target component identification whether it is allowed to be accessed
Target component 1 Yes
Target component 2 No
Target component 3 Yes Step 305: saving the mix access component list.

After saving the mix access component list, the installation of the application 1 in the system is completed, and in a subsequent usage procedure, allowing to or preventing from accessing the basic component can be implemented according to the installation result of the application 1, the following steps 306 to 309 show this procedure.

Step 306: when the first application accesses the first target component, retrieving the mix access component list, acquiring the information that whether the first target component is allowed to be accessed.

In this embodiment, it is assumed that when the application 1 accesses the target component B, the above-described table 1 is retrieved, the information that whether the target component B is allowed to be accessed by the application 1 is acquired as "No".

Step 307: judging whether the acquired information indicates allowing to be accessed, if so, step 308 is executed; otherwise, step 309 is executed.

Step 308: allowing the first application to access the first target component, finishing the current flow.

When the acquired information indicates allowing the first application to access the first target component, the first application is allowed to access the first target component.

Step 309: preventing the first application from accessing the first target component, finishing the current flow.

When the acquired information indicates not allowing the first application to access the first target component, the first application is prevented from accessing the first target component.

Figure 4:
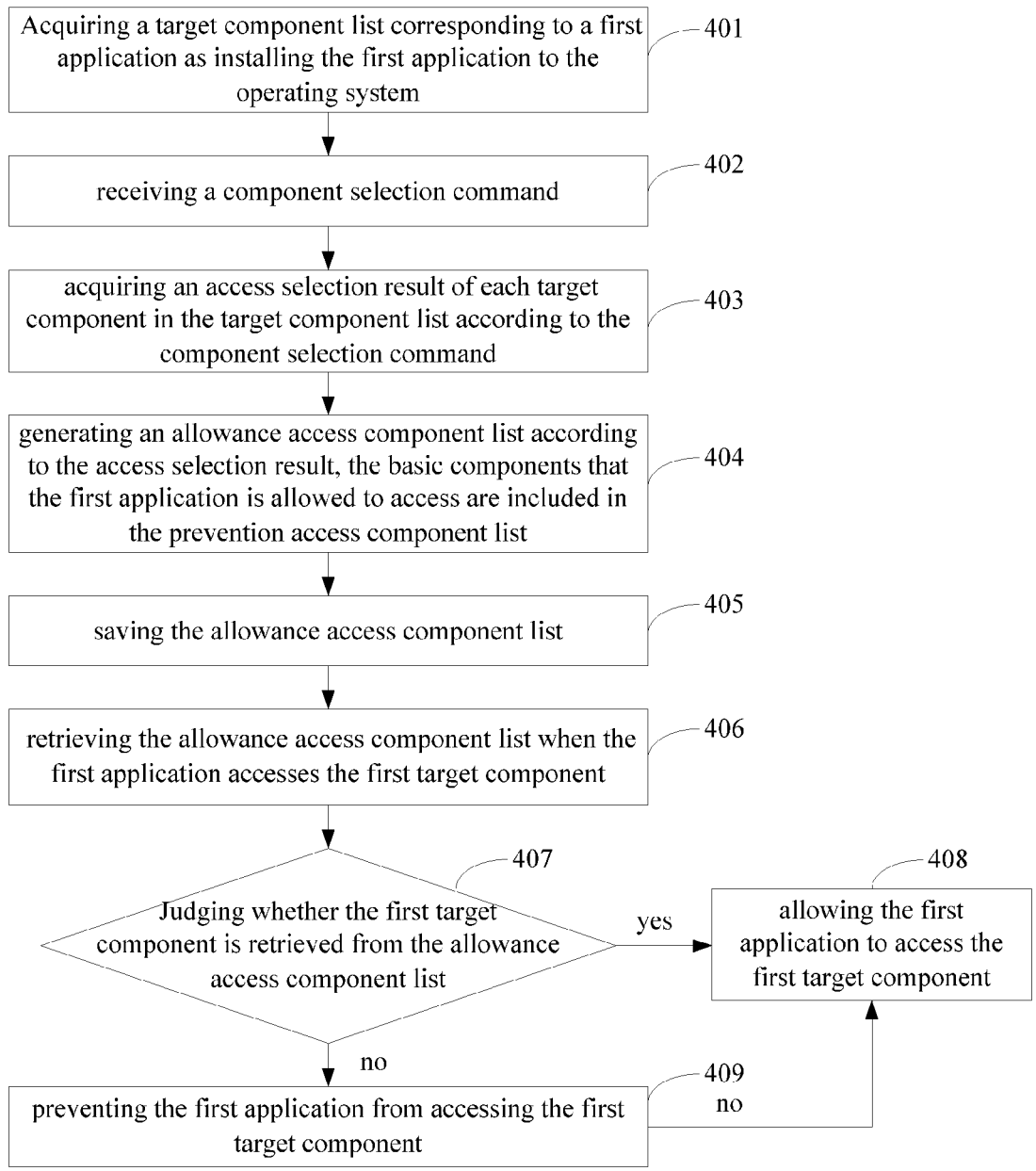
FIG. 4 is a flow chart of the fourth embodiment of the component access control method of the present application.

Referring to FIG. 4, it is a flow chart of the fourth embodiment of the component access control method of the present application, this embodiment shows the procedure of implementing the component access control through an allowance access component list:

Step 401: acquiring the target component list corresponding to the first application as installing the first application to the operating system.

At least one target component needed to be used by the first application is included in the target component list, the at least one target component belongs to a part of the several basic components in the operating system. In the embodiment of the present application, when the first application is the Android applications, the target component list is generally a file of format of AndroidManifest.xml, all of the target components corresponding to the first application are recorded in this file, this embodiment describes by taking the application 1 corresponding to the target component A, the target component B and the target component C as example.

Step 402: receiving a component selection command.

In this embodiment, the received component selection command may be the component selection command input manually by the user, or the component selection command generated according to the preset component access strategy.

Wherein, when the component selection command is input manually by the user, the target component list corresponding to the application 1 is called out firstly, then the user selects manually that whether the target component A, the target component B, the target component C are allowed to be accessed, the selection result is represented by Yes/No; when the component selection command is generated according to the preset component access strategy, it is assumed that the component access strategy is prohibiting the applications from accessing the target component B, whether the target component B is included in the target component list is retrieved after the target component list corresponding to the application 1 is called out, and if the target component B is included, it is automatically set as prohibiting the application 1 to access the target component B.

Step 403: acquiring the access selection result of each target component in the target component list according to the component selection command.

In the step 402, no matter the component selection command is input manually by the user, or the component selection command is generated according to a preset component access strategy, the access selection result of the application 1 to the target component is generated, it is assumed that the selection result is prohibiting the application 1 from accessing the target component B.

Step 404: generating an allowance access component list according to the access selection result, the basic components that the first application is allowed to access is included in the allowance access component list.

In the allowance access component list of the application 1 generated according to the aforementioned selection result, the target component A and the target component C that the application 1 is allowed to access are included.

Step 405: saving the allowance access component list.

After saving the allowance access component list, the installation of the application 1 in the system is completed, and in a subsequent usage procedure, allowing to access or preventing from accessing the basic component can be implemented according to the installation result of the application 1, the following steps 406 to 409 show this procedure.

Step 406: when the first application accesses the first target component, retrieving the allowance access component list.

Step 407: judging whether the first target component is retrieved in the allowance access component list, if so, step 408 is executed; otherwise, step 409 is executed.

Step 408: allowing the first application to access the first target component, finishing the current flow.

When the first target component is retrieved in the allowance access component list, the first application is allowed to access the first target component.

Step 409: preventing the first application from accessing the first target component, finishing the current flow.

When the first target component is not retrieved in the prevention access component list, the first application is prevented from accessing the first target component.

Generating the information of the basic component that the application is allowed to access as installing the application to the operating system and how to allow or prevent the access to the basic component after the application is installed are illustrated by the first to fourth embodiments mentioned above. In the above-described illustrated embodiments, an authority library can be set specifically to save the information of the target component that are allowed to be accessed, that is, a preset component policy can be saved by the authority library, the authority library can support a dynamic modification, that is, the user can set that which target components are allowed to be accessed by the application as required. Further, it may also be set in the preset component strategy that, when the function corresponding to the first basic component is abnormal, for example, if the user found that the message fee is excess, it can determine that the function of sending message is abnormal, also for example, if the system automatically monitors that the function of reading message per minute is used frequently and exceeds the preset threshold, it can determine that the function of reading message is abnormal, at this time the basic components corresponding to the functions of sending message and reading message can be set as the basic components preventing all of the applications installed in the operating system from accessing in the authority library, so as to ensure the security of the system.

The above-described embodiments do not need to set to access all of the target components as applying for the applications, but can control the component that the application is allowed to access as installing the application according to the requirement of the system or the user, so as to increase flexibility of the application accessing the target component, reduce the probability of the user's privacy being stolen; and, since the access of the application to the component can be controlled and selected, the access resource of the system can be saved efficiently, the stability of the system is increased.

The procedure of controlling the access to the basic component in the procedure of using the application when the application is installed in the conventional ways is illustrated through the fifth to sixth embodiments as follows.

Figure 5:
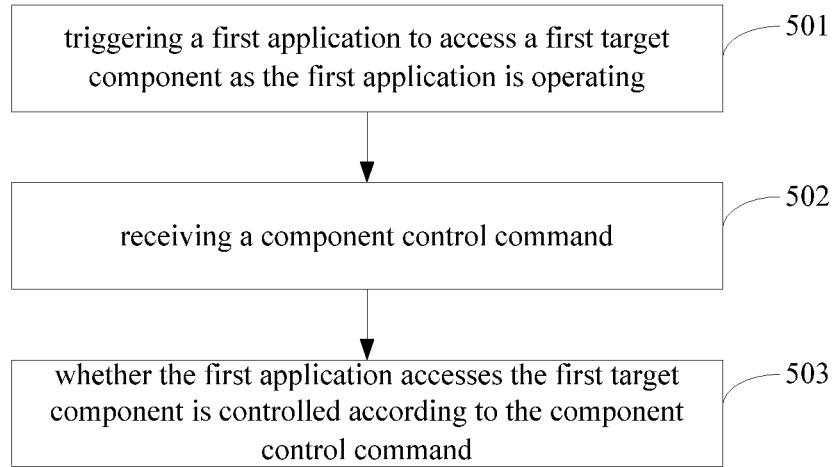
FIG. 5 is a flow chart of the fifth embodiment of the component access control method of the present application.

Referring to FIG. 5, it is a flow chart of the fifth embodiment of the component access control method of the present application:

Step 501: triggering the first application to access the first target component when the first application is operated.

Wherein, at least one target component needed to be used by the first application is included in the target list corresponding to the first application, the first target component is included in the at least one target component, the at least one target component belongs to the at least one basic component.

In this embodiment, it is assumed that it is default that the first application can access all of the target component corresponding thereto as installing the first application, when the first application is running, if it is required to access a certain target component, the target component is triggered firstly.

Step 502: receiving a component control command.

When the first application triggers to access the first target component, at this time, the first target component cannot be accessed directly and the component control command is received firstly for deciding whether to access the first target component.

Specifically, the component control command that whether the first target component is allowed to be accessed input manually by the user can be received, for example, the selection command that whether the first target component is allowed to be accessed is output on the display interface of the electronic apparatus, if the user inputs manually a command of allowance, the access to the first target component is executed, if the user inputs manually a command of prevention, the access to the first target component is prevented; or, a component control command that whether the first target component is allowed to be accessed generated according to a preset component access strategy can be received, for example, it is assumed that preset usage frequency threshold of the target component is ten times per week, the accumulative times of the access of the first application to the first target component in the current time period is judged, if the accumulative access times exceed ten times, it automatically prevents the first application from accessing the first target component, and if the accumulative access times are less than ten times, it allows the first application to access the first target component.

No matter employing the component control command input manually or inputting component control command according to the preset component access strategy as mentioned above, the target component that the first application is not allowed to access can be added to the prevention access component list.

Step 503: controlling whether the first application accesses the first target component according to the component control command.

Figure 6:
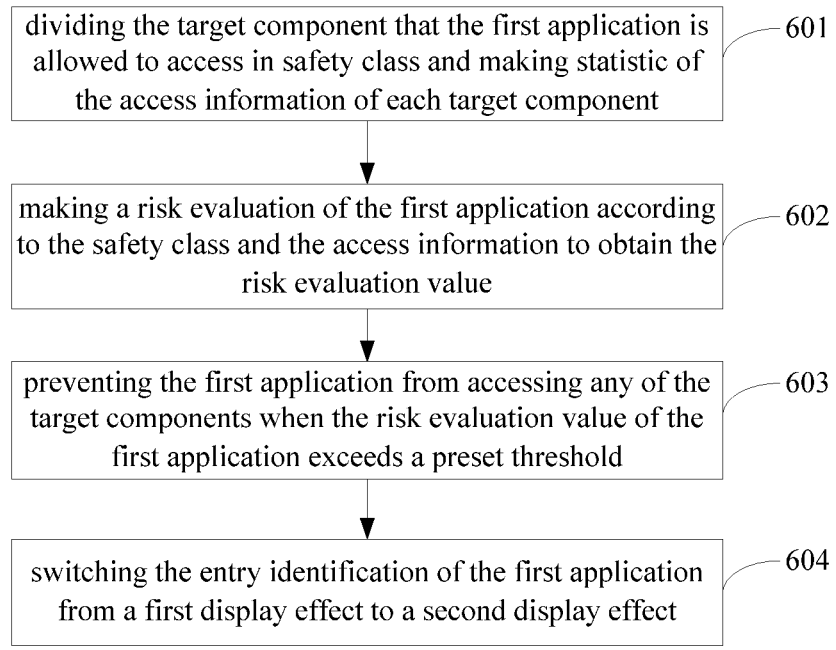
FIG. 6 is a flow chart of the sixth embodiment of the component access control method of the present application.

Referring to FIG. 6, it is a flow chart of the sixth embodiment of the component access control method of the present application, this embodiment illustrates the procedure of controlling the application to access the target component according to the risk assessment result of the application:

Step 601: dividing the target components that the first application is allowed to access in safety class, and making statistic of the access information of each target component.

The division of the safety class may be according to the practical need, it is assumed that it is divided into ten levels in this embodiment, each target component that the first application is allowed to access can be divided in safety class for the first application, each target application corresponds to one safety class, it is assumed that the first application corresponds to the target component A, the target component B and the target component C, the user can assign one safety class to the above-described three target components in advance, respectively.

The access information thereof is made statistic for each target component corresponding to the first application respectively, for example, for the target component corresponding to the function of reading message, it makes an statistic that how many messages are read totally, for the target component corresponding to the function of sending message, it makes an statistic that how many messages are sent out totally, for the target component corresponding to the function of accessing network, it makes an statistic that how many bytes of flow are consumed totally, and for the target component corresponding to the function of making phone call, it makes an statistic that how many time durations are consumed, etc., no more details repeated one by one here.

Step 602: making risk assessment to the first application according to the safety class and the access information to obtain a risk assessing value.

For each target component corresponding to the first application, the safety class and statistical access information thereof can be obtained according to the above-described steps, it may further classify the first application in advance, at this time, the three attributes of the safety class, the access information and the classification information may be assigned a corresponding percentage value, it is assumed that the percentage value of the safety class, the access information and the classification information are 50%, 30% and 20% respectively, when the first application is made risk assessment, the weighting total value of the safety class of each target component can be multiplied by the percentage cost of 50% thereof, then the access information result multiplied by the percentage cost of 30% thereof, and finally the classification information value multiplied by the percentage cost of 20% thereof, and then the above-described three values are added up to obtain the risk assessment value of the first application, the risk assessing value can be unified as one numerical value belonging to the range of 1 to 10, and it can be preset that the corresponding application is an application with high risk when the numerical value is larger than 7.

Step 603: preventing the first application to access any of target components when the risk assessment value of the first application exceeds a preset threshold.

When the risk assessment value of the first application exceeds the preset threshold, the first application can be added automatically to the application list prohibited from being accessed, and in order to ensure the security of the system subsequently, the usage of the first application is prohibited.

Step 604: switching the entry identification of the first application from a first display effect to a second display effect.

For the prohibited first application, it can't access any of the target components, and at this time, the entry identification of the first application can be switched from the first display effect to the second display effect on the application interface, for example, the color of the icon of the application is changed from normal display to highlighted display, so as to prompt the user to pay attention to the first application or unload the first application.

In the above-described embodiment, it does not need to set as accessing all components as applying for applications, but the component allowed to be accessed by the application is controlled as using the application according to the requirement of the system or the user, so as to increase the flexibility of the application accessing the component, reduce the probability of the user's privacy being stolen; since the access of the application to the component can be controlled and selected, thus the access resource of the system can be saved efficiently, the stability of the system is increased; and whether to use the application can be controlled according to the assessment result to the application, thus the security of the system is enhanced.

Corresponding to the embodiments of the component access control method of the present application, the present application further provides embodiments of the electronic apparatus. The electronic apparatus in the embodiments of the present application comprises an operating system, at least one basic component is included in the operating system, and each basic component corresponds to one function of the operating system.

Figure 7:
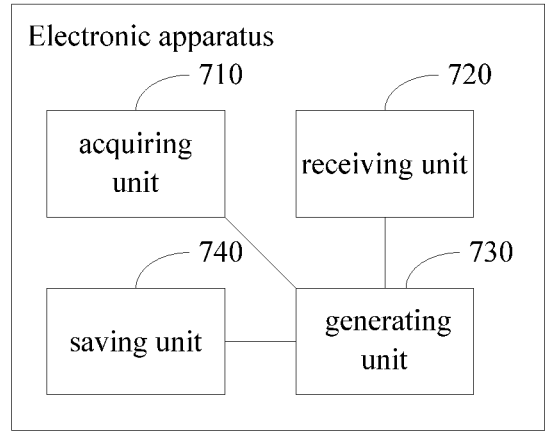
FIG. 7 is a block diagram of the first embodiment of the electronic apparatus of the present application.

Referring to FIG. 7, it is a block diagram of the first embodiment of the electronic apparatus of the present application:

The electronic apparatus comprises an acquiring unit 710, a receiving unit 720, a generating unit 730 and a saving unit 740.

Wherein, the acquiring unit 710 is for acquiring a target component list corresponding to the first application as installing the first application to the operating system, at least one target component needed to be used by the first application is included in the target component list, the at least one target component belongs to the at least one basic component;

The receiving unit 720 is for receiving a component selection command;

The generating unit 730 is for generating information of the basic components that the first application is allowed to access from the target component list according to the component selection command;

The saving unit 740 is for saving the information of the basic components that the first application is allowed to access.

Specifically, the receiving unit 720 may comprise at least one of the following units (not illustrated in FIG. 7): a first receiving unit for receiving the component selection command input manually by the user; a second receiving unit for receiving the component selection command generated according to a preset component access strategy.

Figure 8:
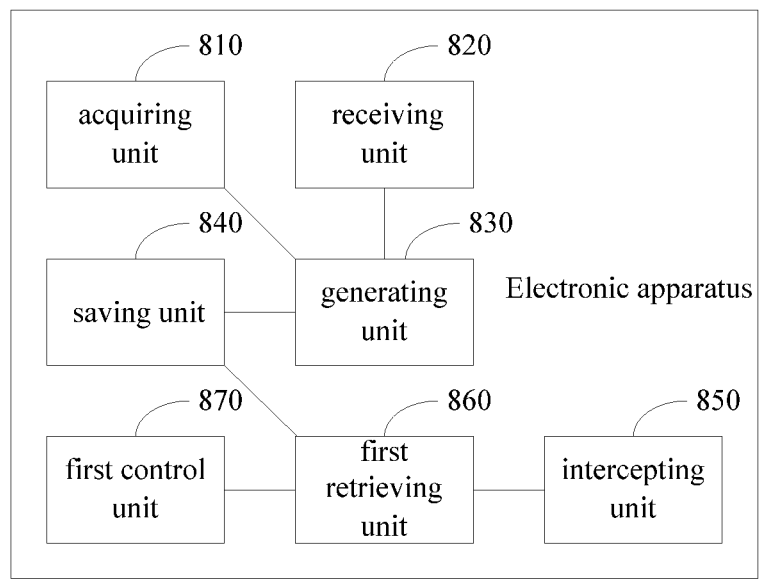
FIG. 8 is a block diagram of the second embodiment of the electronic apparatus of the present application.

Referring to FIG. 8, it is a block diagram of the second embodiment of the electronic apparatus of the present application:

The electronic apparatus comprises an acquiring unit 810, a receiving unit 820, a generating unit 830, a saving unit 840, an intercepting unit 850, a first retrieving unit 860 and a first control unit 870.

Wherein, the acquiring unit 810 is for acquiring a target component list corresponding to the first application as installing the first application to the operating system, at least one target component needed to be used by the first application is included in the target component list, the at least one target component belongs to the at least one basic component.

The receiving unit 820 is for receiving the component selection command.

The generating unit 830 is for generating information of the basic components that the first application is allowed to access from the target component list according to the component selection command. Specifically, the generating unit 830 may comprise (not illustrated in FIG. 8): a first selection result acquiring unit for acquiring access selection result of each target component in the target component list according to the component selection command; a first component list generating unit for generating the prevention access component list according to the access selection result, the basic components that the first application is prohibited from accessing are included in the prevention access component list.

The saving unit 840 is for saving the prevention access component list and the target component list.

The intercepting unit 850 is for intercepting the access of the first application to the target component list when the first application accesses the first target component.

The first retrieving unit 860 is for retrieving the prevention access component list.

The first control unit 870 is for preventing the first application from accessing the first target component when the first target component is included in the prevention access component list, retrieving the target component list when the first target component is not in the prevention access component list, allowing the first application to access the first target component when the first target component is included in the target component list, preventing the first application from accessing the first target component when the first target component is not included in the target component list.

Figure 9:
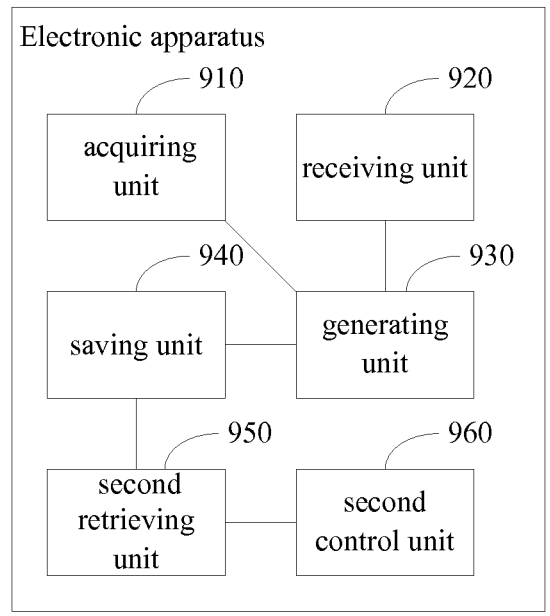
FIG. 9 is a block diagram of the third embodiment of the electronic apparatus of the present application.

Referring to FIG. 9, it is a block diagram of the third embodiment of the electronic apparatus of the present application.

The electronic apparatus comprises an acquiring unit 910, a receiving unit 920, a generating unit 930, a saving unit 940, a second retrieving unit 950 and a second control unit 960.

Wherein, the acquiring unit 910 is for acquiring the target component list corresponding to the first application as installing the first application to the operating system, at least one target component needed to be used by the first application is included in the target component list, the at least one target component belongs to the at least one basic component.

The receiving unit 920 is for receiving the component selection command.

The generating unit 930 is for generating information of the basic components that the first application is allowed to access from the target component list according to the component selection command. Specifically, the generating unit 930 may comprise (not illustrated in FIG. 9): a second selection result acquiring unit for acquiring the access selection result of each target component in the target component list according to the component selection command; a second component list generating unit for generating the mix access component list according to the access selection result, each target component and the information on whether it is allowed to be accessed are included in the mix access component list.

The saving unit 940 is for saving the mix access component list.

The second retrieving unit 950 is for retrieving the mix access component list when the first application accesses the first target component, acquiring the information on whether the first target component is allowed to be accessed;

The second control unit 960 is for allowing the first application to access the first target component when the information indicates allowance, and prevent the first application from accessing the first target component when the information indicates prevention.

Figure 10:
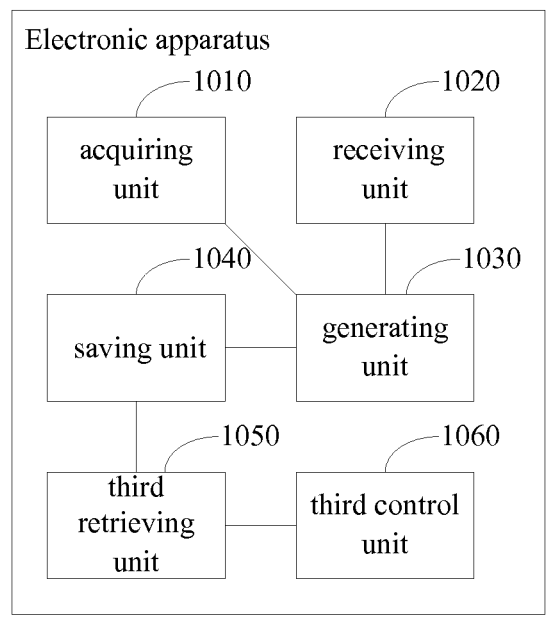
FIG. 10 is a block diagram of the fourth embodiment of the electronic apparatus of the present application.

Referring to FIG. 10, it is a block diagram of the fourth embodiment of the electronic apparatus of the present application:

The electronic apparatus comprises an acquiring unit 1010, a receiving unit 1020, a generating unit 1030, a saving unit 1040, a third retrieving unit 1050 and a third control unit 1060.

Wherein, the acquiring unit 1010 is for acquiring the target component list corresponding to the first application as installing the first application to the operating system, at least one target component needed to be used by the first application is included in the target component list, the at least one target component belongs to the at least one basic component.

The receiving unit 1020 is for receiving the receive component selection command.

The generating unit 1030 is for generating information of the basic components that the first application is allowed to access from the target component list according to the component selection command. Specifically, the generating unit 1030 may comprise (not illustrated in FIG. 10): a third selection result acquiring unit for acquiring the access selection result of each target component in the target component list according to the component selection command; a third component list generating unit for generating an allowance access component list according to the access selection result, the basic components that the first application is allowed to access are included in the allowance access component list;

The saving unit 1040 is for saving the allowance access component list.

The third retrieving unit 1050 is for retrieving the allowance access component list when the first application accesses the first target component;

The third control unit 1060 is for allowing the first application to access the first target component when the first target component is retrieved in the allowance access component list, preventing the first application from accessing the first target component when the first target component is not retrieved in the allowance access component list.

Figure 11:
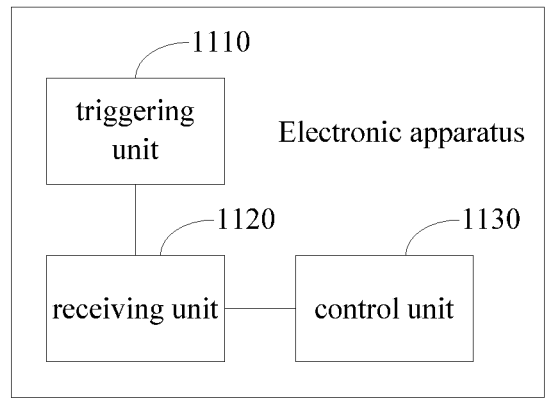
FIG. 11 is a block diagram of the fifth embodiment of the electronic apparatus of the present application.

Referring to FIG. 11, it is a block diagram of the fifth embodiment of the electronic apparatus of the present application:

The electronic apparatus comprises a triggering unit 1110, a receiving unit 1120 and a control unit 1130.

Wherein, the triggering unit 1110 is for triggering the first application to access the first target component when the first application is operated, at least one target component needed to be used by the first application is included in the target list corresponding to the first application, the first target component is included in the at least one target component, the at least one target component belongs to the at least one basic component;

The receiving unit 1120 is for receiving the component control command;

The control unit 1130 is for controlling whether the first application accesses the first target component according to the component control command.

Specifically, the receiving unit 1120 may comprise at least one of the following units (not illustrated in FIG. 11): a first receiving unit for receiving the component control command that whether the first target component is allowed to be accessed input manually by the user; a second receiving unit for receiving the component control command that whether the first target component is allowed to be accessed generated according to a preset component access strategy.

Figure 12:
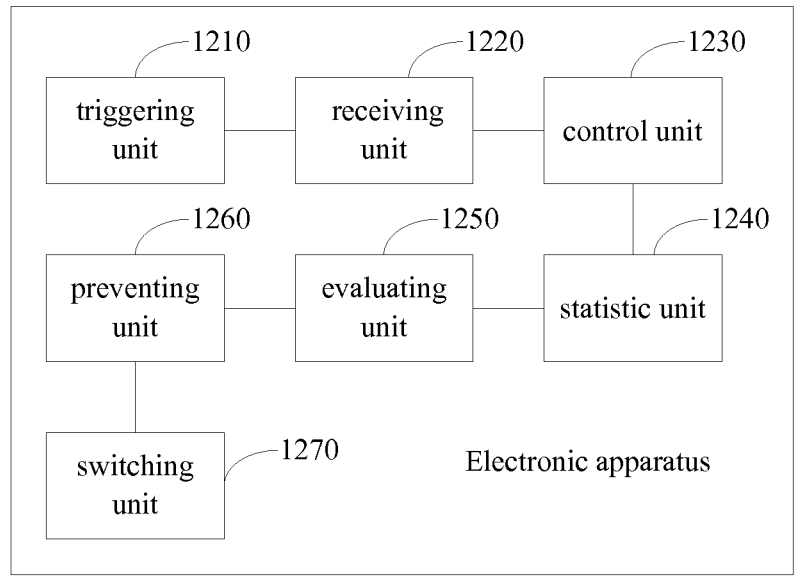
FIG. 12 is a block diagram of the sixth embodiment of the electronic apparatus of the present application.

Referring to FIG. 12, it is a block diagram of the sixth embodiment of the electronic apparatus of the present application:

The electronic apparatus comprises a triggering unit 1210, a receiving unit 1220, a control unit 1230, a statistical unit 1240, an assessing unit 1250, a preventing unit 1260 and a switching unit 1270.

Wherein, the triggering unit 1210 is for triggering the first application to access the first target component when the first application is operated, at least one target component needed to be used by the first application is included in the target list corresponding to the first application, the first target compo- nent is included in the at least one target component, the at least one target component belongs to the at least one basic component;

The receiving unit 1220 is for receiving the component control command;

The control unit 1230 is for controlling that whether the first application accesses the first target component according to the component control command.

The statistical unit 1240 is for dividing the target components that the first application is allowed to access in safety class and making statistic of access information of each target component;

The assessing unit 1250 is for making risk assessment to the first application according to the safety class and the access information to obtain a risk assessment value;

The preventing unit 1260 is for preventing the first application from accessing any of the target components when the risk assessment value of the first application exceeds a preset threshold;

The switching unit 1270 is for switching the entry identification of the first application from a first display effect to a second display effect.

It can be seen from the above description of the implementation modes that, the electronic apparatus in the embodiments of the present application comprises an operating system, at least one basic component is included in the operating system, each basic component corresponds to one function in the operating system, a target component list corresponding to the first application is acquired as installing the first application to the operating system, information of the basic components that the first application is allowed to access is generated from the target component list according to the component selection command after receiving the component selection command, the information of the basic components that the first application is allowed to access is saved.

Compared to the prior art, the solutions in the embodiments of the present application do not need to set as accessing all of the components as applying for the applications, but can control the component that the applications are allowed to access as installing the application or using the application according to the requirement of the system or the user, so as to increase flexibility of the application accessing the component, reduce the probability of the user's privacy being stolen; and, since the access of the application to the component can be controlled and selected, the access resource of the system can be saved efficiently, the stability of the system is increased.

Those skilled in the art can understand clearly that the technology in the embodiments of the present application can be implemented by means of software with necessary general hardware platform. Based on such understanding, the technical solutions in the embodiments of the present application essentially or the part contributed to the prior art can be embodied by a form of a software product, the computer software product can be stored in a storage medium, such as ROM/RAM, magnetic disc, optical disk or the like, it comprises some instructions to cause a computer equipment (it may be a personal computer, a server or a network equipment or the like) to execute the method according to the respective embodiments or a certain part of the embodiments of the present application.

The respective embodiments in this specification are described in a stepwise manner, the same or similar parts between the respective embodiments can be referred to with each other, and the emphasized explanations of the respective embodiments are the difference from other embodiments. Especially, for the system embodiments, since they are substantially similar to the method embodiments, the description is comparatively simple, and relevant part can be referred to the explanation of the part of the method embodiments.

The above implementation modes of the present application are not restriction to the scope protected by the present application. Any modification, equivalent alternation, improvement, or the like within the spirit and principle of the present application should be included in the scope protected by the present application.

What is claimed is:

1. A component access control method, applied to an electronic apparatus, the electronic apparatus comprises an operating system, at least one basic component is included in the operating system, each basic component corresponds to one function of the operating system, and the method comprises:

acquiring a target component list corresponding to a first application as installing the first application to the operating system, the target component list including at least one target component needed to be used by the first application, the at least one target component belonging to the at least one basic component which is requisite for the operating system of the electronic apparatus;

generating information of each basic component that the first application is allowed to access from the target component list according to a component selection command after receiving the component selection command; and saving the information of each basic component that the first application is allowed to access, dividing the basic components that the first application is allowed to access in safety class, and make statistic of access information of each target component;

making risk assessment of the first application according to the safety class and the access information to obtain a risk assessment value; and preventing the first application from accessing any of the target components when the risk assessment value of the first application exceeds a preset threshold wherein the generating the information of the basic components that the first application is allowed to access from the target component list according to the component selection command comprises:

acquiring access selection result of each target component in the target component list according to the component selection command;

generating a prevention access component list according to the access selection result, the basic components that the first application is prohibited from accessing are included in the prevention access component list.

2. The method according to claim 1, characterized in that, receiving the component selection command comprises:

receiving the component selection command via input by a user; or receiving the component selection command which is generated according to a preset component access strategy.

3. The method according to claim 1, further comprises:

intercepting the access of the first application to the target component list when the first application accesses a first target component;

retrieving the prevention access component list, and preventing the first application from accessing the first target component when the first target component is included in the prevention access component list;

retrieving the target component list when the first target component is not in the prevention access component list, allowing the first application to access the first target component when the first target component is included in the target component list, preventing the first application from accessing the first target component when the first target component is not included in the target component list.

4. The method according to claim 1, characterized in that, generating the information of each basic component that the first application is allowed to access from the target component list according to the component selection command comprises:

acquiring access selection result of each target component in the target component list according to the component selection command;

generating a mix access component list according to the access selection result, each target component and the information on whether each target component is allowed to be accessed are included in the mix access component list;

saving the information of each basic component that the first application is allowed to access specifically includes saving the mix access component list.

5. The method according to claim 4, further comprises:

retrieving the mix access component list when the first application accesses the first target component, and acquiring the information on whether the first target component is allowed to be accessed; and allowing the first application to access the first target component when the information indicates allowance, and preventing the first application from accessing the first target component when the information indicates prevention.

6. The method according to claim 1, characterized in that, generating the information of each basic component that the first application is allowed to access from the target component list according to the component selection command comprises:

acquiring access selection result of each target component in the target component list according to the component selection command;

generating an allowance access component list according to the access selection result, each basic component that the first application is allowed to access is included in the allowance access component list; and saving the information of the basic components that the first application is allowed to access specifically includes saving the allowance access component list.

7. The method according to claim 6, further comprises:

retrieving the allowance access component list when the first application accesses the first target component; and allowing the first application to access the first target component when the first target component is retrieved in the allowance access component list, and preventing the first application from accessing the first target component when the first target component is not retrieved in the allowance access component list.

8. The method according to claim 2, characterized in that, the preset component access strategy comprises:

setting a first basic component as the basic component that all of the applications installed in the operating system are prevented from accessing when the function corresponding to the first basic component is abnormal.

9. A component access control method, applied to an electronic apparatus, the electronic apparatus comprises an operating system, at least one basic component is included in the operating system, each basic component corresponds to one function of the operating system, and the method comprises:

triggering a first application to access a first target component in a target component list corresponding to the first application when the first application is operated, the target component list including at least one target component needed to be used by the first application, the first target component belonging to the at least one basic component which is requisite for the operating system of the electronic apparatus;

receiving a component control command, and controlling whether or not the first application accesses the first target component according to the component control command;

dividing the target components that the first application is allowed to access in safety class, and make statistic of access information of each target component;

making risk assessment of the first application according to the safety class and the access information to obtain a risk assessment value; and preventing the first application from accessing any of the target components when the risk assessment value of the first application exceeds a preset threshold wherein the controlling whether or not the first application accesses the first target component according to the component control command comprising:

acquiring access selection result of each target component in the target component list according to the component control command;

generating a prevention access component list according to the access selection result, the basic components that the first application is prohibited from accessing are included in the prevention access component list.

10. The method according to claim 9, characterized in that, receiving the component control command comprises:

receiving the component control command with respect to whether the first target component is allowed to be accessed via input by a user; or receiving the component control command with respect to whether the first target component is allowed to be accessed according to the preset component access strategy.

11. The method according to claim 9, further comprises:

switching an entry identification of the first application from a first display effect to a second display effect.

12. An electronic apparatus, characterized in that, the electronic apparatus comprises:

an operating system, at least one basic component is included in the operating system, each basic component corresponds to one function of the operating system;

a processor; and a memory that stores computer program instructions, wherein, when the computer program instructions are executed by the processor, then functions to be performed include:

acquiring a target component list corresponding to the first application as installing the first application to the operating system, the target component list including at least one target component needed to be used by the first application, the at least one target component belonging to the at least one basic component which is requisite for the operating system of the electronic apparatus;

receiving a component selection command;

generating information of each basic component that the first application is allowed to access from the target component list according to the component selection command; and saving the information of each basic component that the first application is allowed to access in the memory;

dividing the basic components that the first application is allowed to access in safety class and making statistic of access information of each target component;

making a risk assessment of the first application according to the safety class and the access information to obtain a risk assessment value; and preventing the first application from accessing any of the target components when the risk assessment value of the first application exceeds a preset threshold the generating information of each basic component that the first application is allowed to access from the target component list according to the component selection command comprises:

receiving an access selection result of each target component in the target component list according to the component selection command;

generating a prevention access component list according to the access selection result, the basic components that the first application is prohibited from accessing are included in the prevention access component list, the prevention access component list and the target component list being saved in the memory.

13. The electronic apparatus according to claim 12, characterized in that, the receiving of the component selection command includes:

receiving the component selection command input manually by a user; and receiving the component selection command generated according to a preset component access strategy.

14. The electronic apparatus according to claim 12, characterized in that, the generating information of each basic component that the first application is allowed to access from the target component list according to the component selection command comprises:

acquiring an access selection result of each target component in the target component list according to the component selection command;

generating a mix access component list according to the access selection result, each target component and information on whether the target component is allowed to be accessed are included in the mix access component list, the mix access component list being saved in the memory.

15. The electronic apparatus according to claim 12, characterized in that, the generating information of each basic component that the first application is allowed to access from the target component list according to the component selection command comprises:

acquiring an access selection result of each target component in the target component list according to the component selection command;

generating an allowance access component list according to the access selection result, the basic components that the first application is allowed to access are included in the allowance access component list, the allowance access component list being saved in the memory.

16. An electronic apparatus, characterized in that, the electronic apparatus comprises:

an operating system, at least one basic component is included in the operating system, each basic component corresponds to one function of the operating system;

a processor and a memory that stores computer program instructions, wherein, when the computer program instructions are executed by the processor, then functions to be performed include:

triggering a first application to access a first target component in a target component list corresponding to the first application when the first application is operated, the target component list including at least one target component needed to be used by the first application, the first target component belonging to the at least one basic component which is requisite for the operating system of the electronic apparatus receiving a component control command, controlling whether or not the first application accesses the first target component according to the component control command, dividing the target components that the first application is allowed to access in safety class and making statistic of access information of each target component making a risk assessment of the first application according to the safety class and the access information to obtain a risk assessment value and preventing the first application from accessing any of the target components when the risk assessment value of the first application exceeds a preset threshold.

17. The electronic apparatus according to claim 16, characterized in that, the receiving of the component control command includes:

receiving the component control command to control whether the first target component is allowed to be accessed input manually by a user and;

receiving the component control command to control whether the first target component is allowed to be accessed generated according to a preset component access strategy.

* * * * *